(12) United States Patent
Lin et al.

(10) Patent No.: US 12,363,682 B2
(45) Date of Patent: Jul. 15, 2025

(54) METHOD FOR RESOURCE RESERVATION PERIODICITY IN NR SIDE LINK COMMUNICATION

(71) Applicant: GUANGDONG OPPO MOBILE TELECOMMUNICATIONS CORP., LTD., Guangdong (CN)

(72) Inventors: Huei-Ming Lin, Taiwan (CN); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 487 days.

(21) Appl. No.: 17/732,423

(22) Filed: Apr. 28, 2022

(65) Prior Publication Data

US 2022/0256509 A1    Aug. 11, 2022

Related U.S. Application Data

(63) Continuation of application No. PCT/CN2020/130623, filed on Nov. 20, 2020.

(60) Provisional application No. 62/938,315, filed on Nov. 20, 2019.

(51) Int. Cl.
| | |
|---|---|
| H04W 28/26 | (2009.01) |
| H04W 72/02 | (2009.01) |
| H04W 72/0446 | (2023.01) |
| H04W 72/20 | (2023.01) |

(52) U.S. Cl.
CPC .......... H04W 72/02 (2013.01); H04W 28/26 (2013.01); H04W 72/0446 (2013.01); H04W 72/20 (2023.01)

(58) Field of Classification Search
None
See application file for complete search history.

(56) References Cited

U.S. PATENT DOCUMENTS

| | | | |
|---|---|---|---|
| 2017/0150490 | A1 | 5/2017 | Chen et al. |
| 2018/0270796 | A1 | 9/2018 | Chae et al. |
| 2019/0053183 | A1 | 2/2019 | Park et al. |
| 2019/0150161 | A1 | 5/2019 | Cheng et al. |
| 2019/0191461 | A1* | 6/2019 | Lee ................. H04W 72/12 |

(Continued)

FOREIGN PATENT DOCUMENTS

| | | |
|---|---|---|
| CN | 108432214 | 8/2018 |
| CN | 108632779 | 10/2018 |

(Continued)

OTHER PUBLICATIONS

"Office Action of Europe Counterpart Application, Application No. 20890134.8", issued on Sep. 4, 2023, p. 1-p. 5.

(Continued)

Primary Examiner — Jenkey Van
(74) Attorney, Agent, or Firm — Hodgson Russ LLP (57) ABSTRACT

A method for sidelink resource reservation periodicity in supporting sidelink communication, the method comprising: preconfiguring or configuring by a first node a set of possible resource reservation periodicity values for sidelink packet transport block (TB) transmission, wherein the set of possible resource reservation periodicity values comprises at least one range of predefined possible resource reservation periodicity values.

14 Claims, 6 Drawing Sheets

(56) References Cited

U.S. PATENT DOCUMENTS

2019/0261414 A1  8/2019  Ron et al.
2022/0369291 A1* 11/2022  Shibaike .............. H04L 1/1887

FOREIGN PATENT DOCUMENTS

| | | |
|---|---|---|
| CN | 109565791 | 4/2019 |
| CN | 109792718 | 5/2019 |
| JP | 2018527845 | 9/2018 |
| KR | 20190017632 | 2/2019 |
| WO | 2017176099 A1 | 10/2017 |
| WO | 2018166508 | 9/2018 |
| WO | 2018175528 A1 | 9/2018 |
| WO | 2018175553 A1 | 9/2018 |
| WO | 2018219485 | 12/2018 |
| WO | 2019028759 A1 | 2/2019 |
| WO | 2019064466 A1 | 4/2019 |
| WO | 2019066629 A1 | 4/2019 |
| WO | 2019148376 A1 | 8/2019 |
| WO | 2019157739 | 8/2019 |
| WO | 2020222532 A1 | 11/2020 |

OTHER PUBLICATIONS

"Office Action of China Counterpart Application, Application No. 202210356730.X", with English translation thereof, issued on Sep. 9, 2023, p. 1-p. 14.
OPPO, "Support of mode 2a resource allocation for NR-V2X", 3GPP TSG-RAN WG1 Meeting #96bis R1-1904922, Apr. 8-12, 2019, pp. 1-8.
Samsung, "On Resource Allocation for NR V2X Mode 2", 3GPP TSG RAN WG1 #99 R1-1912460, Nov. 18-22, 2019, pp. 1-8.
"Search Report of of counterpart Europe application No. 20890134.8", issued on Dec. 19, 2022, p. 1-p. 11.
"Office Action of China Counterpart Application, Application No. 202210356730.X", with English translation thereof, Issued on Jun. 15, 2023, p. 1-p. 15.
Intel Corporation, "Resource Selection Latency Reduction for LTE V2V Sidelink Communication", 3GPP TSG RAN WG1 Meeting #92bis R1-1804691, Apr. 16-20, 2018, pp. 1-5.
"Office Action of Europe Counterpart Application, Application No. 20890134.8", issued on Mar. 5, 2024, p. 1-p. 6.
"International Search Report (Form PCT/ISA/210) of PCT/CN2020/130623," mailed on Feb. 7, 2021, pp. 1-2.
"Written Opinion of the International Searching Authority (Form PCT/ISA/237) of PCT/CN2020/130623," mailed on Feb. 2021, pp. 1-4.
"Office Action of India Counterpart Application, Application No. 202227026248", issued on Sep. 7, 2022, pp. 1-5.
"Office Action of Europe Counterpart Application, Application No. 20890134.8", issued on Aug. 13, 2024, p. 1-p. 4.
"Office Action of Japan Counterpart Application, Application No. 2021-572935", with English translation thereof, issued on Sep. 30, 2024, p. 1-p. 6.
EPO, Fourth Office Action issued in European Patent Application No. 20890134.8, Jan. 10, 2025.
JPO, Second Office Action issued in Japanese Patent Application No. 2021-572935, Jan. 28, 2025.
IPI, Hearing Notice of the Indian Patent Application No. 202227026248, Jan. 30, 2025.
Intel Corporation, "Summary#1 for AI 7.2.4.2.2 Mode-2 Resource Allocation," 3GPP TSG RAN WG1 Meeting #99, R1-1913232, Reno, Nevada, USA, Nov. 18-22, 2019.
Intel Corporation, "Sidelink physical structure for NR V2X communication," 3GPP TSG RAN WG1 Meeting #99, R1-1913255 (revised R1-1912203), Reno, Nevada, USA, Nov. 18-22, 2019.
Huawei et al., "Performance enhancements for NB-IoT coexistence with NR," 3GPP TSG RAN WG1 Meeting #99, R1-1911909, Reno, USA, Nov. 18-22, 2019.
Vivo, "Physical layer structure for NR sidelink," 3GPP TSG RAN WG1 #99 Meeting, R1-1912020, Reno, USA, Nov. 18-22, 2019.
Sony, "Resource allocation mechanism for NR sidelink Mode 2," 3GPP TSG RAN WG1 #99, R1-1912344, Reno, USA, Nov. 8-22, 2019.
Intel Corporation, "Summary#4 for AI 7.2.4.2.2 Mode-2 Resource Allocation," 3GPP TSG RAN WG1 Meeting #99, R1-1913569, Reno, Nevada, USA, Nov. 18-22, 2019.
Intel Corporation, "Summary#3 for AI 7.2.4.2.2 Mode-2 Resource Allocation," 3GPP TSG RAN WG1 Meeting #99, R1-1913525, Reno, Nevada, USA, Nov. 18-22, 2019.
Intel Corporation, "Summary#2 for AI 7.2.4.2.2 Mode-2 Resource Allocation," 3GPP TSG RAN WG1 Meeting #99, R1-1913450, Reno, Nevada, USA, Nov. 18-22, 2019.
EPO, Fifth Office Action issued for European Patent Application No. 20890134.8, Apr. 2, 2025.

\* cited by examiner

METHOD FOR RESOURCE RESERVATION PERIODICITY IN NR SIDE LINK COMMUNICATION

CROSS-REFERENCE TO RELATED APPLICATION

This application is a continuation of international application of PCT application serial no. PCT/CN2020/130623 filed on Nov. 20, 2020, which claims the priority benefit of U.S. provisional application No. 62/938,315 filed on Nov. 20, 2019. The entirety of each of the above mentioned patent applications is hereby incorporated by reference herein and made a part of this specification.

BACKGROUND OF THE DISCLOSURE

1. Field of the Disclosure

The present invention relates to the field of sidelink communication (SL). In particular, the present invention relates to methods and apparatus for sidelink resource reservation periodicity for sidelink communication.

2. Description of Related Art

In recent years vehicle-to-everything (V2X) communication is attracting significant interest mostly due to the role it is expected to play in the development of safe and high-reliable transport based on autonomous driving vehicles. The V2X communication involves in general device-to-device communication such as vehicle-to-vehicle (V2V) communication, Vehicle-to-Roadway Infrastructure (V2I) Communication, Vehicle-to-Pedestrian (V2P) communication and the like. The V2X may also involve a device-to-network communication.

The device-to-device communication enables for direct communication between the devices, without the need for the communication to go through a node in the network such as a base station. The devices are normally in the proximity to each other. The devices that are in the proximity to each other may be in the network coverage, the so called in-coverage scenario, but may also be out of the network coverage, the so called out-of-coverage scenario.

In the Long Term Evolution (LTE) standard for wireless communication this device-to-device communication is called a sidelink communication. Sidelink communication enables for direct communication between proximal devices. Data is directly exchanged between the proximal devices.

In LTE sidelink communication, it is assumed that the transmissions of sidelink packet transport blocks (TBs) are periodic and very deterministic. The range of periodicity values that are supported in LTE sidelink communication is fixed to {0, 20, 50, 100, 200, 300, 400, 500, 600, 700, 800, 900, 1000} ms for basic safety messages. With basic safety messages (BSM) usually vehicle state information, such as location, velocity and so on are exchanged between the vehicles that communicate through sidelink communication.

However, the evolution of LTE towards the new radio (NR) technology, also called 5G NR, requires also evolution of the V2X communication so that it is supported by the NR. This evolution is currently under study in the 3rd generation partnership project (3GPP).

For NR technology, the range of periodicity values supported currently by the LTE technology may not be appropriate since the message periodicity for advanced V2X use cases could be much smaller and there may be wide range of values that may potentially be used.

Therefore, there is a need for providing for a method and apparatus for sidelink reservation periodicity for sidelink communication that increases the flexibility in the sidelink reservation periodicity.

SUMMARY OF THE DISCLOSURE

The mentioned problems and objects are met by the subject-matter of the independent claims. Advantageous embodiments are defined in the dependent claims.

According to one embodiment of the present invention there is provided a method for sidelink resource reservation periodicity in supporting sidelink communication, the method comprising: preconfiguring or configuring by a first node a set of possible resource reservation periodicity values for sidelink packet transport block (TB) transmission, wherein the set of possible resource reservation periodicity values comprises at least one range of predefined possible resource reservation periodicity values.

According to a further embodiment of the present invention there is provided a node in a network supporting sidelink communication, the node being configured to: configure a set of possible resource reservation periodicity values for sidelink packet transport block (TB) transmission, wherein the set of possible resource reservation periodicity values comprises at least one range of predefined possible resource reservation periodicity values.

According to a further embodiment of the present invention there is provided a user equipment (UE) for performing a sidelink communication, the user equipment being configured to: indicate to another UE a resource reservation period from a set of possible resource reservation periodicity values.

According to a still further embodiment of the present invention there is provided a method for performing a sidelink communication, the method comprising: indicate by a user equipment to another user equipment a resource reservation period from a set of possible resource reservation periodicity values.

BRIEF DESCRIPTION OF THE DRAWINGS

Embodiments of the present invention which are presented for better understanding the inventive concept of the present invention, but which are not to be seen as limiting the present invention, will now be described with reference to the figures in which.

DESCRIPTION OF THE EMBODIMENTS

Figure 1:
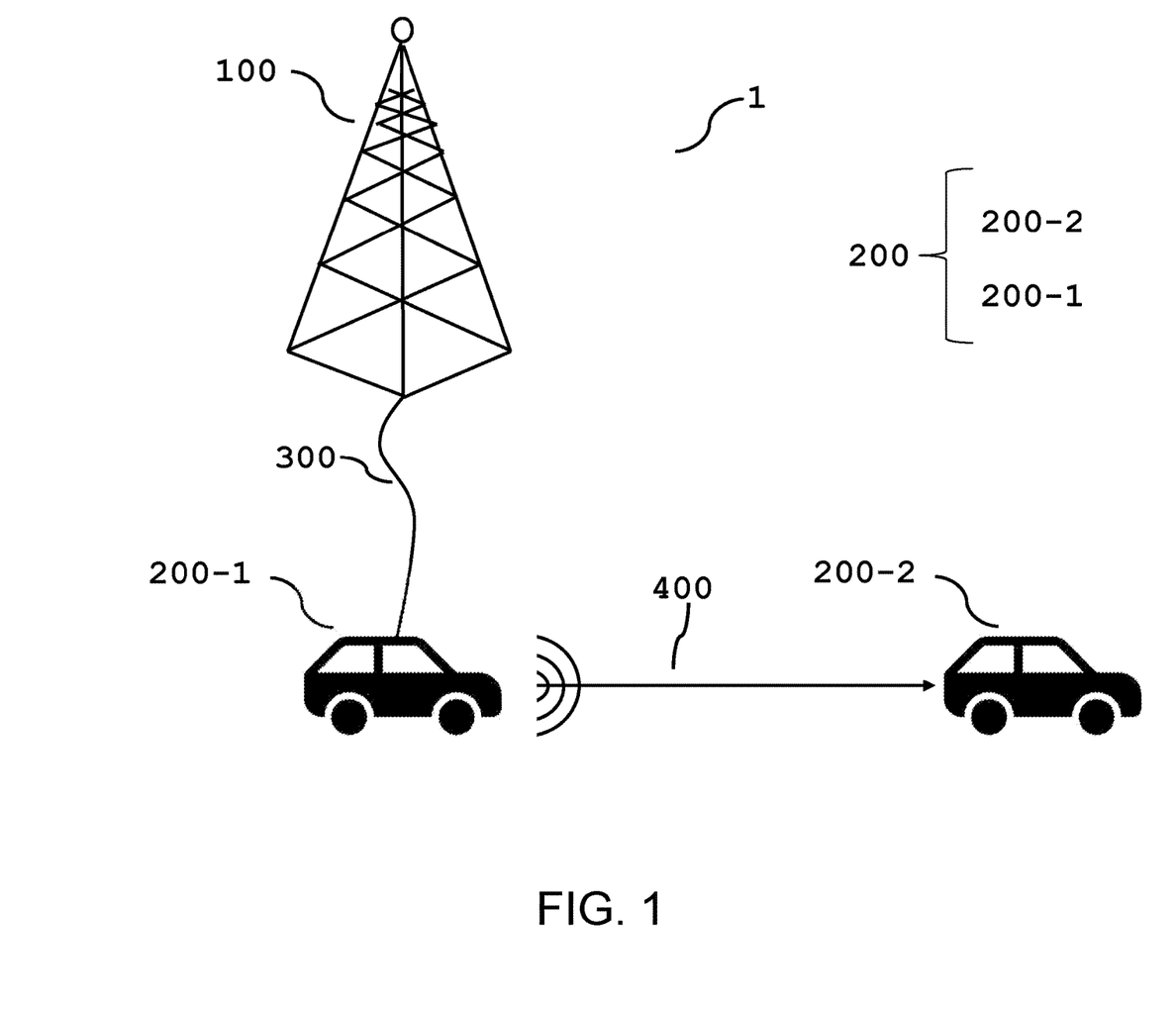
FIG. 1 shows schematically the network architecture according to an embodiment of the present invention.

FIG. 1 shows schematically the network architecture for sidelink communication according to one embodiment of the present invention.

The network architecture 1 for sidelink communication may support any kind of cellular wireless communication technology. The network architecture 1 may comprise at least one network node 100 and at least one user equipment (UE) 200. The wireless communication technology may be the LTE technology but may be the NR technology. However, this is by no means to be seen as limiting to the present invention.

FIG. 1 shows an example of the network architecture 1 as comprising one network node 100, a first UE 200-1 and a second UE 200-2. This is however not limiting, and the network architecture 1 may comprise more than or less network nodes 100 and UEs 200. The first UE 200-1 may have a transmitting role and may be called also transmitting UE, while the second UE 200-2 may have a receiving role and may be called receiving UE. The first UE 200-1 and the second UE 200-2 may change the transmitting and receiving roles. In general, a first UE may be considered to have a transmitting role when the first UE is configured to send a sidelink control information, details of which according to an embodiment of the present invention will be described later, to a second UE that has the receiving role to enable the second UE to perform the sidelink communication. Accordingly, the second UE is considered to have a receiving role when the second UE is configured to receive the sidelink control information sent from the first UE that has a transmitting role. In the following it is assumed that in FIG. 1 the first UE 200-1 has the transmitting role and hence is the transmitting UE and the second UE 200-2 has the receiving role and hence is the receiving UE.

The network node 100, the first UE 200-1 and the second UE 200-2 according to the embodiment of the present invention may in general be considered as a device or a node adapted for wireless and/or radio (and/or microwave) frequency communication, and/or communication utilizing an air interface, for example according to a communication standard. The communication standard may be, but is not limited to, the LTE communication standard or the NR communication standard.

The network node 100 may be any kind of network device or radio node of a wireless communication network, such as base station (BS), node B, evolved node B (eNodeB or eNB), NR node N (gNodeB or gNB), relay node, micro, nano, pico or femto node.

Each of the first UE 200-1 and the second UE 200-2 may represent an end device for communication utilizing the wireless communication network, and/or be implemented as a UE according to the LTE, or NR or the like communication standard. Examples of UE may comprise a phone such as a smartphone, a personal communication device, a mobile phone or terminal, a computer, a laptop, a modem, a sensor or machine with radio capability adapted for the air interface and adapted in particular for machine-type-communication (MTC), in particular for machine-to-machine communication (M2M), device-to-device communication (D2D), or a vehicle adapted for wireless communication. The UE 200 may be mobile or stationary, for example part of the roadway infrastructure. FIG. 1 shows the first UE 200-1 and the second UE 200-2 as vehicles adapted for wireless communication.

The network node 100 is able to send to the first UE 200-1 any kind of data, normally called downlink (DL) data via the communication link 300. The first UE 200-1 is able to send to the network node 100 any kind of data normally called uplink (UL) data via the communication link 300. The communication link 300 is the air interface under the LTE or NR or the like wireless communication technology. FIG. 1 shows only the communication link 300 between the network node 100 and the first UE 200-1. Nevertheless, it is understood that the same applies to the second UE 200-2. In other words, communication link 300 may also exists between the network node 100 and the second UE 200-2.

Furthermore, the first UE 200-1 and the second UE 200-2 are able to directly exchange data between each other using sidelink communication via the sidelink communication link 400. The sidelink communication link 400 may be Bluetooth, Wi-Fi or the like. The sidelink communication link 400 is a communication link that supports direct communication between the first UE 200-1 and the second UE 200-2 without the need for the communication to be routed through the network node 100. With the sidelink communication the first UE 200-1 and the second UE 200-2 may be operated in the D2D mode or MTC mode or the like. The sidelink communication link may involve several physical channels, such as but not limited to the Physical Sidelink Shared Channel (PSSCH) and/or the Physical Sidelink Control Channel (PSCCH).

Figure 2:
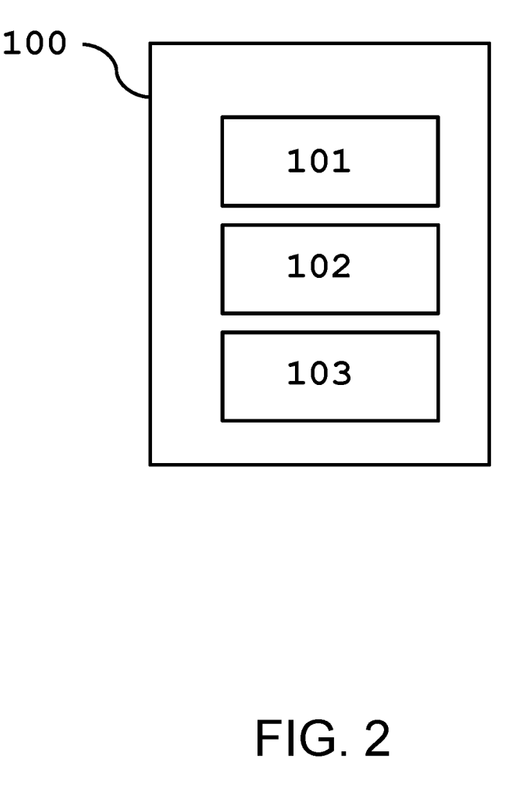
FIG. 2 shows schematically the functional components of a network node according to an embodiment of the present invention.

FIG. 2 shows schematically the network node 100. FIG. 2 shows an exemplary configuration for the network node 100. In particular, FIG. 2 shows an exemplary configuration of the functional components of the network node 100. The network node 100 may comprise a processor 101, a memory 102 and a radio circuitry 103. The processor 101 may be a processing circuitry (which may also be referred to as control circuitry) which may comprise a controller connected to the memory 102. Any module of the network node 100, e.g., a communication module or determining module, may be implemented in and/or executable by, the processing circuitry 101, in particular as module in the controller. The network node 100 comprises further a radio circuitry 103 providing receiving and transmitting or transceiving functionality, e.g., one or more transmitters and/or receivers and/or transceivers, wherein the radio circuitry is connected or connectable to the processing circuitry 101. An antenna circuitry (not shown) of the network node 100 may be connected or connectable to the radio circuitry 103 to collect or send and/or amplify signals. The network node 100 may be adapted to carry out any of the methods for operating the network node 100 disclosed herein; in particular, it may comprise corresponding circuitry, e.g. processing circuitry, and/or modules.

Figure 3:
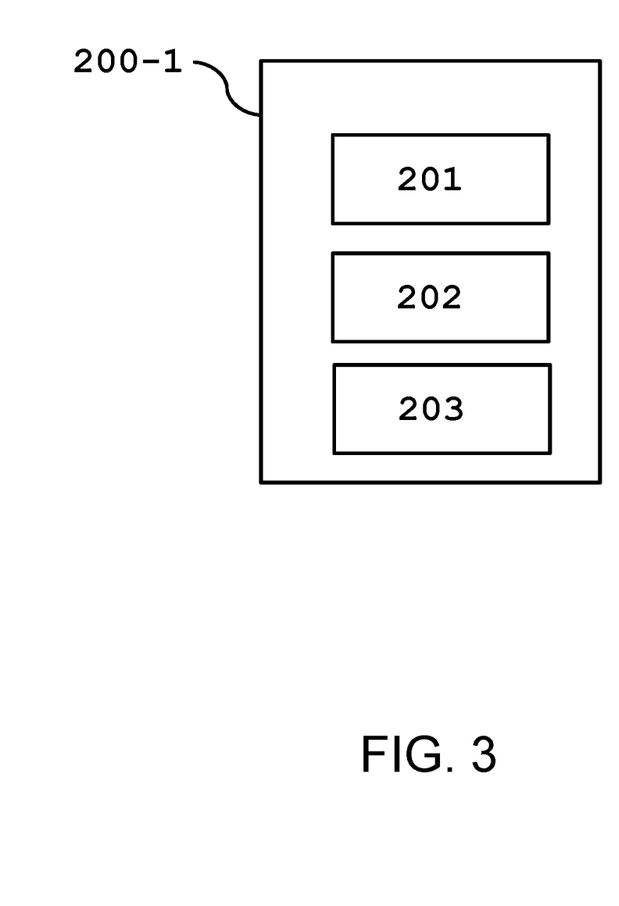
FIG. 3 shows schematically the functional components of a user equipment according to an embodiment of the present invention.

FIG. 3 shows schematically the first UE 200-1. FIG. 3 shows an exemplary configuration for the first UE 200-1. In particular, FIG. 3 shows an exemplary configuration of the functional components of the first UE 200-1. The configuration for the first UE 200-1 shown in FIG. 3 is the same as for the second UE 200-2 and a detailed description about the configuration of the second UE 200-2 is here omitted for conciseness reasons.

The first UE 200-1 may comprise a processor 201 and a memory 202. The processor 201 may be a processing circuitry (which may also be referred to as control circuitry) which may comprise a controller connected to the memory 202. Any module of the UE 200-1, e.g. a communication module or determining module, may be implemented in and/or executable by, the processing circuitry 201, in particular as module in the controller. The UE 200-1 may further comprise radio circuitry 203 providing receiving and transmitting or transceiving functionality, e.g. one or more transmitters and/or receivers and/or transceivers, wherein the radio circuitry is connected or connectable to the processing circuitry 201. An antenna circuitry (not shown) of the first UE 200-1 may be connected or connectable to the radio circuitry 203 to collect or send and/or amplify signals. The first UE 200-1 may be adapted to carry out any of the methods for operating the user equipment disclosed herein; in particular, it may comprise corresponding circuitry, e.g. processing circuitry, and/or modules.

According to the embodiment of the present invention, a computer program product comprises instructions adapted for causing processing and/or control circuitry to carry out and/or control any method described herein, in particular when executed on the processing and/or control circuitry is also considered. Also, a carrier medium arrangement carrying and/or storing a computer program product as described herein is also considered.

A carrier medium arrangement may comprise one or more carrier media. Generally, a carrier medium may be accessible and/or readable and/or receivable by processing or control circuitry. Storing data and/or a computer program product and/or code may be seen as part of carrying data and/or a program product and/or code. A carrier medium generally may comprise a guiding or transporting medium and/or a storage medium. A guiding or transporting medium may be adapted to carry and/or store signals, in particular electromagnetic signals and/or electric signals and/or magnetic signals and/or optical signals. A carrier medium, in particular a guiding or transporting medium, may be adapted to guide such signals to carry them. A carrier medium, in particular a guiding or transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Figure 4:
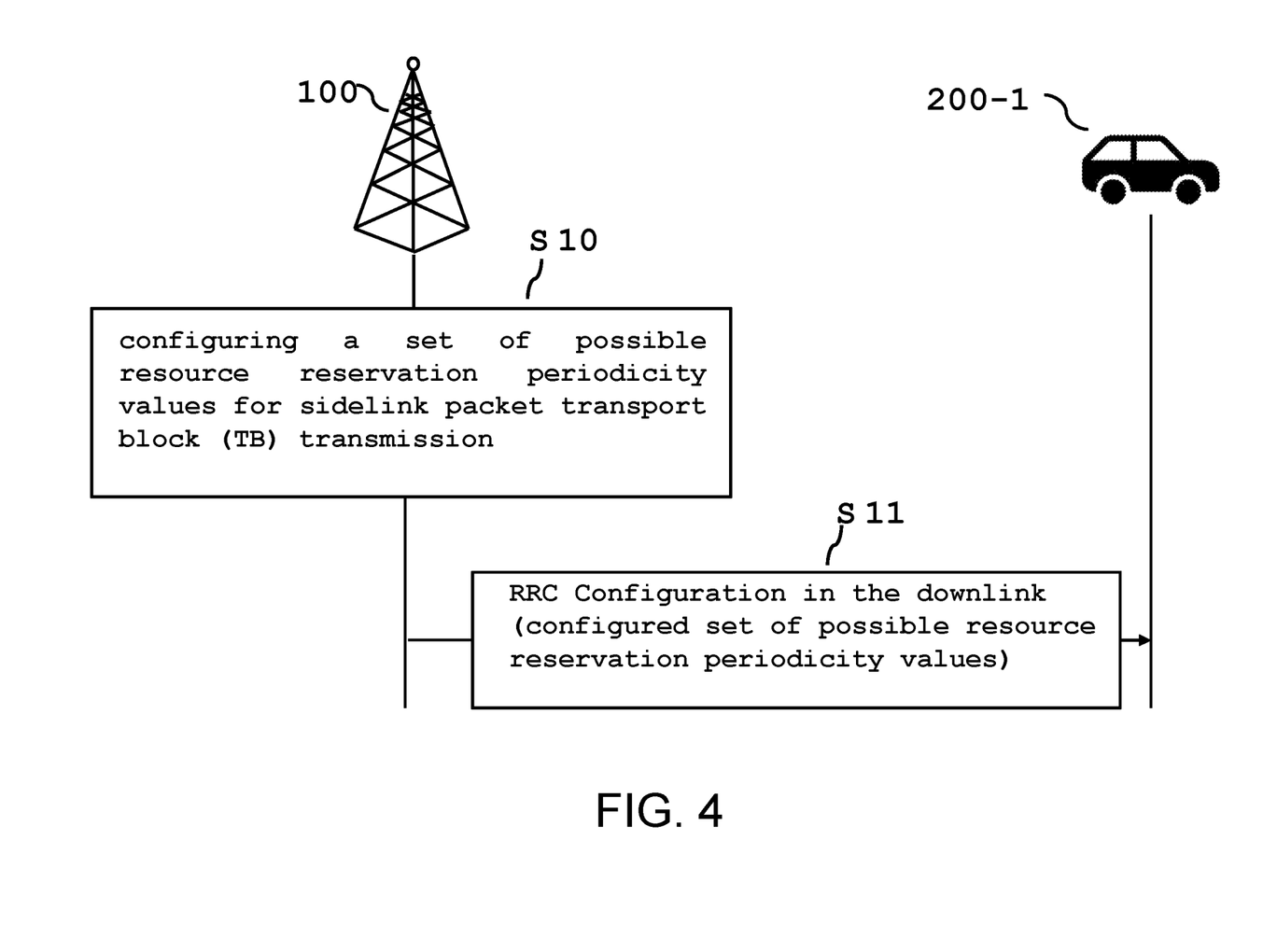
FIG. 4 shows schematically the communication between the network node and the user equipment according to an embodiment of the present invention.

The method for sidelink resource reservation periodicity according to the embodiment of the present invention comprises preconfiguring or configuring by the network node 100 a set of possible resource reservation periodicity values for sidelink packet transport block (TB) transmission. FIG. 4 shows with step S10 the network node 100 configuring a set of possible resource reservation periodicity values for sidelink packet transport block (TB) transmission.

The set of possible resource reservation periodicity values comprises at least one range of predefined possible resource reservation periodicity values.

The at least one range of predefined possible resource reservation periodicity values includes at least {0, 1:99, 100, 200, 300, 400, 500, 600, 700, 800, 900, 1000} millisecond (ms). Here, 1:99 is to be understood as any integer value between and including 1 and 99.

The set of possible resource reservation periodicity values may comprise further at least one value that can be flexibly set by the network node 100.

The method for sidelink resource reservation periodicity according to the embodiment of the present invention may further comprise pre-configuring or configuring by the network node 100 at least one sidelink resource pool. The at least one sidelink resource pool may here below also be called a first sidelink resource pool. In general, a sidelink resource pool is a set of resources assigned to the sidelink communication. The sidelink resource pool may comprise subframes or slots and resource blocks within the subframes or slots.

The method for sidelink resource reservation periodicity according to the embodiment of the present invention may further comprise pre-configuring or configuring by the network node 100 the at least one sidelink resource pool with at least one first set of possible resource reservation periodicity values. In one embodiment of the present invention the at least one first set of possible resource reservation periodicity values is taken from or is a subset of the at least one range of predefined possible resource reservation periodicity values that includes at least {0, 1:99, 100, 200, 300, 400, 500, 600, 700, 800, 900, 1000} ms.

In one embodiment of the present invention the at least one first set of possible resource reservation periodicity values for the first sidelink resource pool may comprise a single resource reservation periodicity value taken from the at least one range of predefined possible resource reservation periodicity values that includes at least {0, 1:99, 100, 200, 300, 400, 500, 600, 700, 800, 900, 1000} ms.

Figure 5:
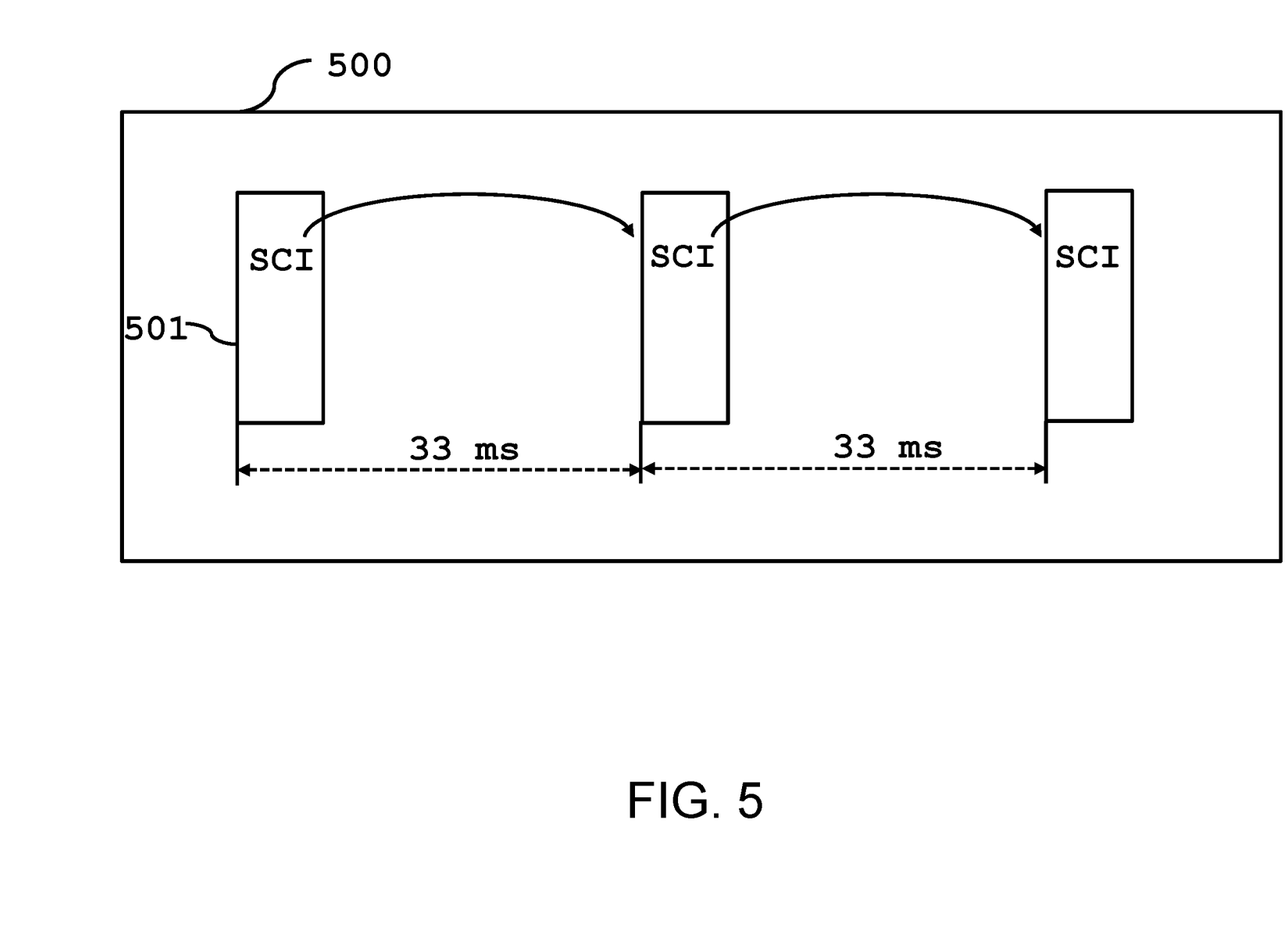
FIG. 5 shows schematically a sidelink resource pool according to an embodiment of the present invention.

FIG. 5 shows an example of a sidelink resource pool 500. The resource reservation periodicity value preconfigured or network configured in the sidelink resource pool 500 shown in FIG. 5 is 33 ms. This means the set of sidelink transmission subframes or slots 501 allowed in the resource pool to be reserved by a UE for transmission of sidelink TBs are periodic with a time period of 33 ms between the beginnings of two consecutive sidelink transmission subframes or slots 501.

The method for sidelink resource reservation periodicity according to the embodiment of the present invention may further comprise pre-configuring or configuring by the network node 100 more than one sidelink resource pool 500. For example, at least one further sidelink resource pool 500 may be preconfigured or the network node 100 may configure at least one further sidelink resource pool 500. The at least one further sidelink resource pool 500 may here below also be called second sidelink resource pool. The method for sidelink resource reservation periodicity according to the embodiment of the present invention may further comprise pre-configuring or configuring by the network node 100 the at least one second resource pool 500 with at least one second set of possible resource reservation periodicity values, wherein the at least one second set of possible resource reservation periodicity values is taken from or a subset of the at least one range of predefined possible resource reservation periodicity values that includes at least {0, 1:99, 100, 200, 300, 400, 500, 600, 700, 800, 900, 1000} ms.

Similar as to the first sidelink resource pool in one embodiment of the present invention the at least one second set of possible resource reservation periodicity values for the second sidelink resource pool may comprise a single resource reservation periodicity value taken from the at least one range of predefined possible resource reservation periodicity values that includes at least {0, 1:99, 100, 200, 300, 400, 500, 600, 700, 800, 900, 1000} ms.

In some embodiments of the present invention, the at least one second set of possible resource reservation periodicity values is different from the at least one first set of possible resource reservation periodicity values. In other words, at least one resource reservation periodicity value in the at least one second set of possible resource reservation periodicity values is different from at least one resource reservation periodicity value in the at least one first set of possible resource reservation periodicity values.

As elaborated above, according to the embodiment of the present invention the network node 100 is configured to configure the set of possible resource reservation periodicity values for sidelink packet transport block (TB) transmission, wherein the set of possible resource reservation periodicity values comprises at least one range of predefined possible resource reservation periodicity values, wherein the at least one range of predefined possible resource reservation periodicity values includes at least {0, 1:99, 100, 200, 300, 400, 500, 600, 700, 800, 900, 1000} ms.

This provides more flexibility in the range of values that could be indicated by the UE having a transmitting role in the sidelink communication. In other words, the predefined range of resource reservation periodicities, which covers all resource reservation periods that can possibly be used in advanced V2X use cases with short latency requirement, offers great flexibility during pre-configuration or network configuration of a set of possible resource reservation periods allowed in a sidelink resource pool, where different resource pools can be used for carrying sidelink services with different traffic patterns and requirements.

In the embodiment of the present invention, the method may, however without being limited to, further comprise the network node 100 configuring the first UE 200-1 of the configured set of possible resource reservation periodicity values for sidelink packet transport block (TB) transmission (step S11 in FIG. 4).

The network node 100 may configure the transmitting UE 200-1 of the configured set of possible resource reservation periodicity values for sidelink packet transport block (TB) transmission through Radio Resource Control (RRC) signalling exchanged between the network node 100 and the first UE 200-1. In general, signaling may comprise one or more signals and/or one or more symbols. Control information or a control information message or corresponding signaling (control signaling) may be transmitted on a control channel, e.g. a physical control channel, which may be a downlink channel or a sidelink channel in some cases, e.g., one UE scheduling another UE. The RRC signalling may involve establishment of an RRC connection or an existence of an active RRC connection between the network node 100 and the first UE 200-1 via the communication link 300. The first UE 200-1 may establish an active RRC connection with the network node 100, for example, via RRC connection establishment procedure. Once RRC connection is established the first UE 200-1 is, for example, in RRC CONNECTED state.

The network node 100 may configure the first UE 200-1 of the configured set of possible resource reservation periodicity values for sidelink packet transport block transmission via dedicated signalling or broadcast system information.

In one embodiment of the present invention the network node 100 configuring the first UE 200-1 of the configured set of possible resource reservation periodicity values for transmission of packet transport block (TB) in a sidelink resource pool may involve, but is not limited to, the network node 100 configuring the first UE 200-1 of one or more resource reservation periodicity values taken from or being a subset of {0, 1:99, 100, 200, 300, 400, 500, 600, 700, 800, 900, 1000} ms. This may involve the network node 100 configuring the first UE 200-1 of the one or more configured resource pools. For example, the network node 100 may configure the first UE 200-1 of the at least one first sidelink resource pool and/or the at least one second sidelink resource pool elaborated above. In a different embodiment of the present invention the network node 100 may configure the first UE 200-1 of the at least one first sidelink resource pool and/or the at least one second sidelink resource pool elaborated above and of at least one further sidelink resource pool configured similar to the at least one first and at least one second sidelink resource pool.

In one embodiment of the present invention, the network node 100 configuring the first UE 200-1 of the configured set of possible resource reservation periodicity values for sidelink packet transport block (TB) may be initiated by the first UE 200-1. For example, the first UE 200-1 may send a request to the network node 100 for resources for sidelink communication.

In the following, the use of the words configuring and preconfiguring as well as configured and preconfigured from the above will be explained. In more details, the words configuring and preconfiguring as well as configured and preconfigured from above are used in accordance with the network coverage scenario when sidelink communication is established between the first UE 200-1 and the second UE 200-2.

The network coverage scenario may involve at least in-coverage scenario and out-of-coverage scenario. The in-coverage scenario relates to the scenario when sidelink communication is established between the first UE 200-1 and the second UE 200-2 and the RRC connection between the first UE 200-1 and the network node 100 is either active or inactive, for example, the first UE 200-1 is in the RRC CONNECTED state, RRC IDLE state or RRC INACTIVE state. The out-of-coverage scenario involves the scenario when sidelink communication is established between the first UE 200-1 and the second UE 200-2 but RRC connection between the first UE 200-1 and the network node is not possible to be established.

In the in-coverage scenario only configuring applies. Configuring is to be understood in the sense that the network node 100 may semi-statically select a set of possible resource reservation periodicity values from a pre-defined range of possible resource reservation periodicity values for sidelink packet transport block (TB) transmission as elaborated above, for example, based on a request from the first UE 200-1 and configure accordingly the first UE 200-1 of the selected set of possible resource reservation periodicity values as elaborated above. For example, the network node may semi-statically determine a sidelink resource pool and a set of possible resource reservation periodicity values for the determined sidelink resource pool and configure the first UE 200-1 of the determined sidelink resource pool and the set of possible resource reservation periodicity values for the determined sidelink resource pool.

In the out-of-coverage scenario only preconfiguring applies. In other words, in the out-of-coverage scenario the first UE 200-1 selects a sidelink resource pool from the pre-configured at least one first sidelink resource pool and at least one second sidelink resource pool. Preconfiguring is to be understood as the first UE 200-1 being pre-stored or programmed in advance with the set of possible resource reservation periodicity values from the at least one range of predefined possible resource reservation periodicity values. For example, the first UE 200-1 may select a sidelink resource pool from the pre-stored or programmed in advance at least one first sidelink resource pool and at least one second sidelink resource pool.

In a still further embodiment of the present invention, the first UE 200-1 may be preconfigured with at least one sidelink resource pool, for example, with the at least one first sidelink resource pool elaborated above, for example, via a user Subscriber Identity Module, SIM. For example, it is possible that the at least one first sidelink resource pool elaborated above is stored in the first UE 200-1, for example, in the subscriber identity module, SIM of the first UE 200-1 or another suitable module of the first UE 200-1. In this embodiment, the first UE 200-1 may use the preconfigured at least one first sidelink resource pool or may select a preconfigured sidelink resource pool, when the first UE 200-1 is preconfigured with more than one sidelink resource pool. In this embodiment, preconfiguring may apply only to the out-of-coverage scenario.

Figure 6:
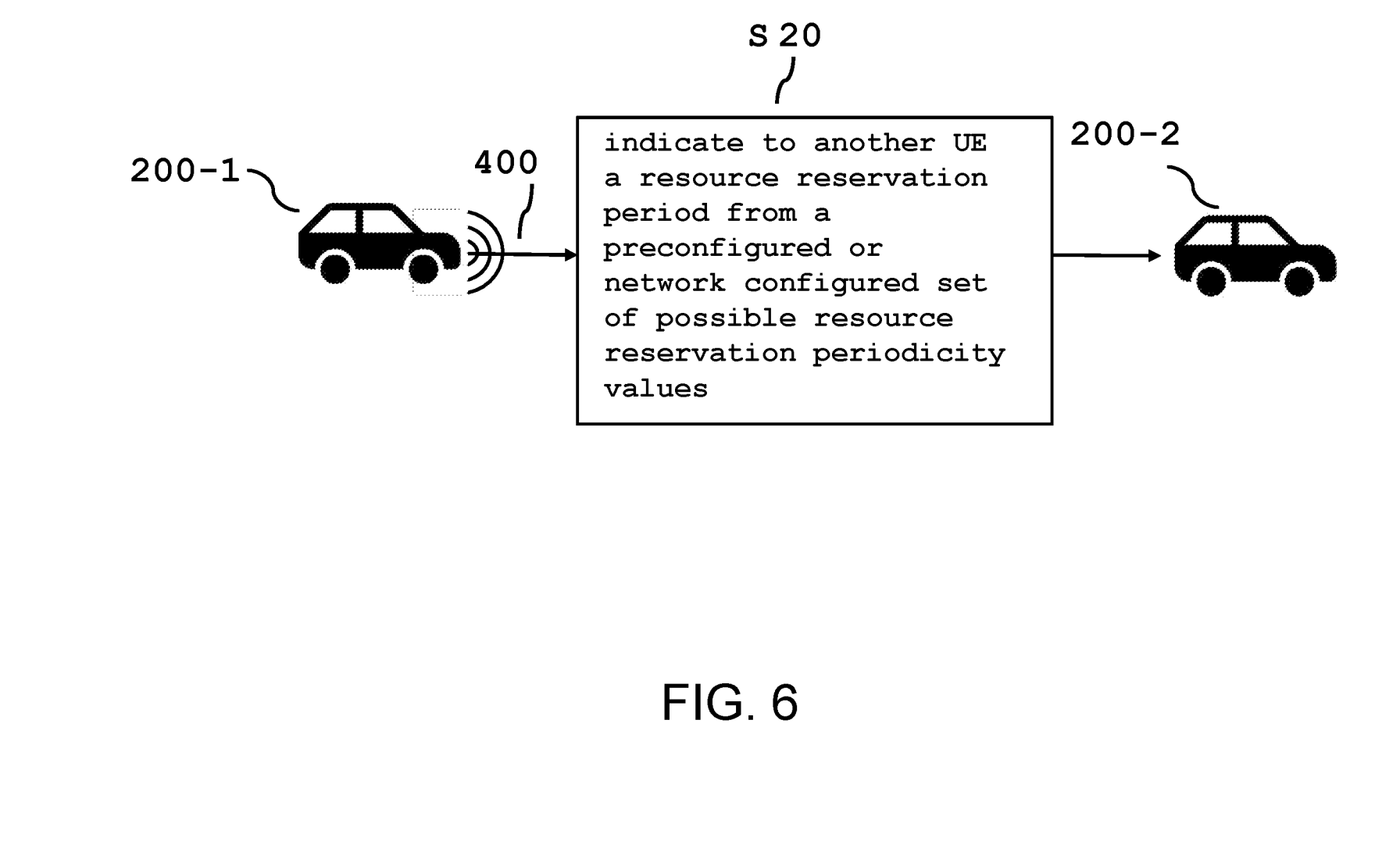
FIG. 6 shows schematically the communication between a transmitting user equipment and a receiving user equipment according to an embodiment of the present invention.

FIG. 6 shows schematically the communication between the first UE 200-1 and the second UE 200-2 according to an embodiment of the present invention.

The first UE 200-1 is configured to indicate to the second UE 200-2 a resource reservation period from a preconfigured or network configured set of possible resource reservation periodicity values (step S20).

The first UE 200-1 may be configured to indicate the resource reservation period from the set of possible resource reservation periodicity values in sidelink control information (SCI) to the second UE 200-2. The resource reservation period may be represented as one or more bits in the sidelink control information (SCI). The sidelink control information (SCI) may comprise further information that the second UE (200-2) may need in order to be able to perform sidelink communication with the first UE 200-1.

The first UE 200-1 may be configured to transmit the sidelink control information to the second UE 200-2 via the Physical Sidelink Shared Channel (PSSCH) or the Physical Sidelink Control Channel (PSCCH). The first UE 200-1 may be configured to transmit the SCI within each subframe or slot in the sidelink resource pool.

The set of possible resource reservation periodicity values is preconfigured or configured per sidelink resource pool. The values from the set of possible resource reservation periodicities are taken from or are a subset of at least one range of predefined possible resource reservation periodicity values that includes at least {0, 1:99, 100, 200, 300, 400, 500, 600, 700, 800, 900, 1000} ms.

FIG. 5, as elaborated above, shows an example of the sidelink resource pool 500 when the preconfigured or network configured resource reservation periodicity value is 33 ms. The set of sidelink transmission subframes or slots 501 allowed in the sidelink resource pool to be reserved by a UE for transmission of sidelink TBs are periodic with a time period of 33 ms between the beginnings of two consecutive sidelink transmission subframes or slots. Each of the sidelink transmissions in subframes or slots 501 comprises sidelink control information (SCI). The sidelink control information comprises at least the resource reservation period, in this example 33 ms.

In the example of a sidelink resource pool 500 shown in FIG. 5 the preconfigured or network configured resource reservation period is 33 ms. However, it is also possible that the first UE 200-1 indicates more than one resource reservation periods for the sidelink resource pool 500. For example, each sidelink control information may comprise different resource reservation periods.

Accordingly, different sidelink resource pools can be configured or pre-configured with different set of periodicity values to suit different sidelink applications, service needs as well as different traffic patterns and requirements.

Although detailed embodiments have been described, these only serve to provide a better understanding of the invention defined by the appended claims and are not be seen as limiting.

What is claimed is:

1. A node in a network supporting sidelink communication, the node being configured to:
    configure a set of possible resource reservation periodicity values for sidelink packet transport block (TB) transmission, and
    configure at least one first configured sidelink resource pool with at least one first set of possible resource reservation periodicity values,
    wherein the set of possible resource reservation periodicity values comprises at least one range of predefined possible resource reservation periodicity values, wherein the at least one first set of possible resource reservation periodicity values is taken from or is a subset of the at least one range of predefined possible resource reservation periodicity values, wherein the at least one range of predefined possible resource reservation periodicity values includes at least {0, all values of 1 to 99, 100, 200, 300, 400, 500, 600, 700, 800, 900, 1000} ms.

2. The node according to claim 1, wherein the set of possible resource reservation periodicity values further comprises at least one value that can be flexibly set.

3. The node according to claim 1 being further configured to configure at least one first sidelink resource pool, wherein the at least one first sidelink resource pool is a set of resources assigned to the sidelink communication.

4. The node according to claim 1 being further configured to configure at least one second sidelink resource pool, and further being configured to configure the at least one second sidelink resource pool with at least one second set of possible resource reservation periodicity values, wherein the at least one second set of possible resource reservation periodicity values is taken from or is a subset of the at least one range of predefined possible resource reservation periodicity values.

5. The node according to claim 4, wherein the at least one second set of possible resource reservation periodicity values is different from at least one first set of possible resource reservation periodicity values.

6. The node according to claim 1, wherein the node is a base station (BS), wherein the BS is gNodeB in a new radio (NR) system or the BS is eNodeB in a long term evolution (LTE) system.

7. A user equipment (UE) for performing a sidelink communication, comprising:
    a radio circuitry; and
    a processor, coupled to the radio circuitry, and configured to:
    indicate, through the radio circuitry, to another user equipment (UE) a resource reservation period from a set of possible resource reservation periodicity values, wherein at least one first configured sidelink resource pool is configured with at least one first set of possible resource reservation periodicity values, and the at least one first set of possible resource reservation periodicity values is taken from or is a subset of at least one range of predefined possible resource reservation periodicity values, wherein the at least one range of predefined possible resource reservation periodicity values includes at least {0, all values of 1 to 99, 100, 200, 300, 400, 500, 600, 700, 800, 900, 1000} ms.

8. The user equipment according to claim 7 being further configured to indicate the resource reservation period from the set of possible resource reservation periodicity values in sidelink control information to the another user equipment.

9. The user equipment according to claim 7, wherein the set of possible resource reservation periodicity values is preconfigured or configured per sidelink resource pool.

10. The user equipment according to claim 7, wherein said set of possible resource reservation periodicity values is taken from or a subset of at least one range of predefined possible resource reservation periodicity values.

11. A method for performing a sidelink communication, the method comprising:
indicate by a user equipment to another user equipment a resource reservation period from a set of possible resource reservation periodicity values, wherein at least one first configured sidelink resource pool is configured with at least one first set of possible resource reservation periodicity values, and the at least one first set of possible resource reservation periodicity values is taken from or is a subset of at least one range of predefined possible resource reservation periodicity values, wherein the at least one range of predefined possible resource reservation periodicity values includes at least {0, all values of 1 to 99, 100, 200, 300, 400, 500, 600, 700, 800, 900, 1000} ms.

12. The method according to claim 11 further indicating by the user equipment to the another user equipment the resource reservation period from the set of possible resource reservation periodicity values in sidelink control information.

13. The method according to claim 11, wherein the set of possible resource reservation periodicity values is preconfigured or configured per sidelink resource pool.

14. The method according to claim 11, wherein said set of possible resource reservation periodicity values is taken from or a subset of at least one range of predefined possible resource reservation periodicity values.

* * * * *